Aug. 20, 1957    E. G. SAENZ    2,803,362
TRAILER TONGUE AND HITCH THEREFOR
Filed Oct. 22, 1954    2 Sheets-Sheet 1
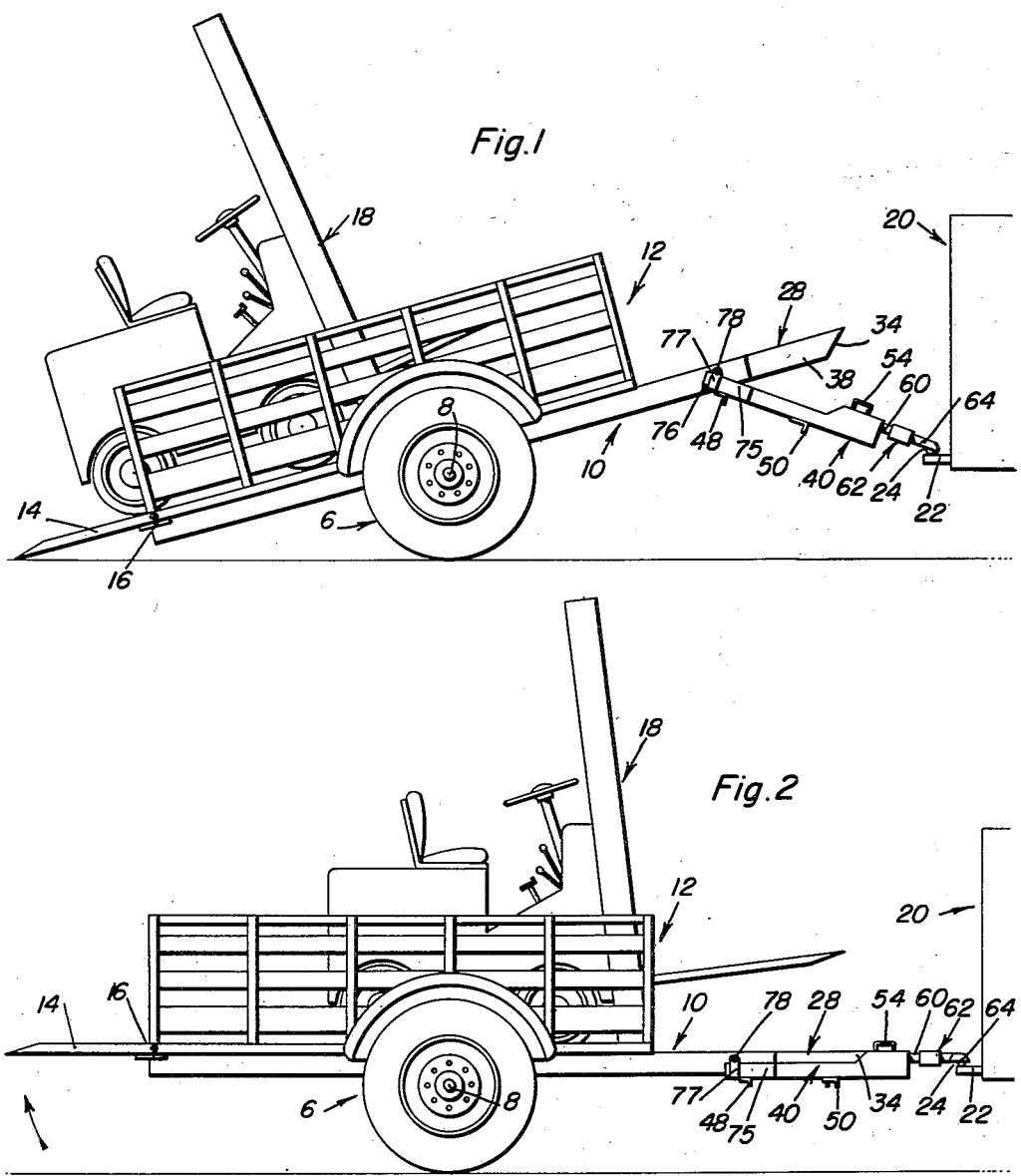
Eustolio G. Saenz
INVENTOR.

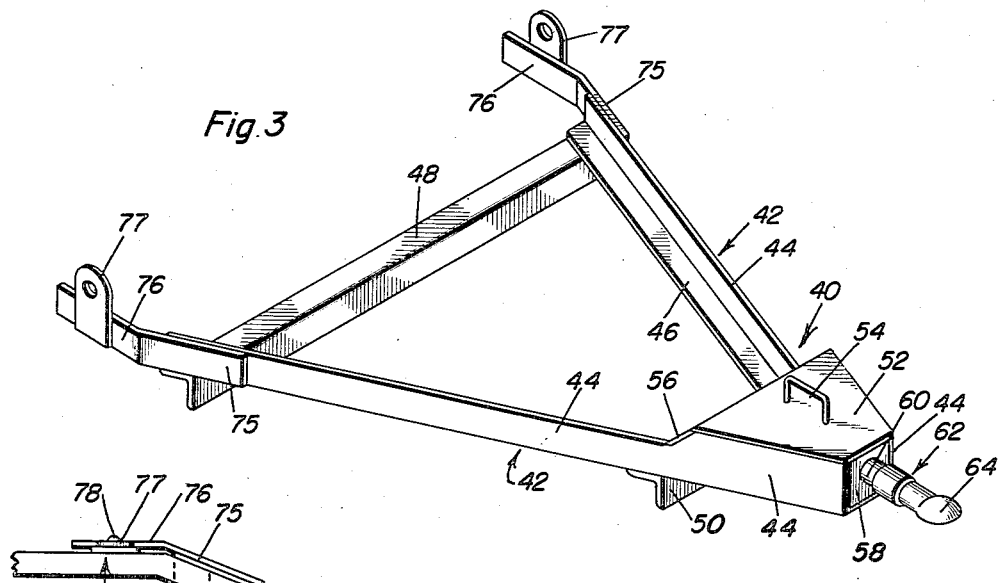
Fig. 3
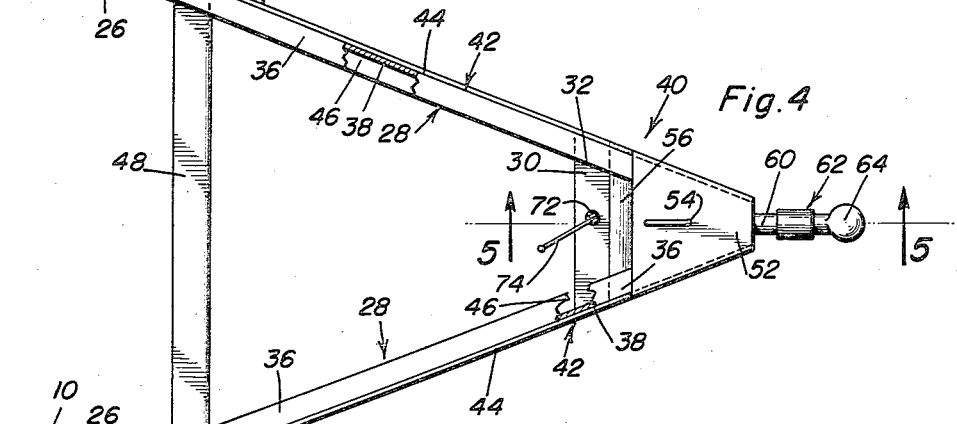
Fig. 4
Fig. 5
Eustolio G. Saenz
INVENTOR.

United States Patent Office 2,803,362
Patented Aug. 20, 1957

2,803,362

TRAILER TONGUE AND HITCH THEREFOR

Eustolio G. Saenz, San Antonio, Tex.

Application October 22, 1954, Serial No. 463,924

2 Claims. (Cl. 214—506)

The present invention relates, very generally speaking, to a two-wheeled trailer and tow truck combination, but has reference, more particularly stated, to the draw-bar or tongue of the trailer, which latter is such that it allows a two-wheeled crate-like trailer body to be tilted downwardly and rearwardly so that the tail gate thereon may temporarily function as a loading and unloading ramp.

There has long existed a need for a two-wheeled tilt-type trailer capable of use where heavy equipment is to be moved, that is, where it may be placed on the trailer depending, of course, on what it is to be used for. For example, it has been found feasible to utilize a simple tail-gate equipped trailer in situations where, for example, a fork-lift is to be transported to the job to do certain work and then returned to the shop as soon as reasonably possible. Generally, a fork-lift is transported to an expected destination where it is employed to unload soda water pallets from a loaded truck after which it is returned to the shop or plant by way of the stated trailer. To the end that the needs of all concerned may be satisfactorily achieved the herein improved trailer is constructed with a structurally novel tongue which obviates the necessity of unhitching the trailer from the towing truck, thus obviating the need for several men to hitch or unhitch the fork-loaded trailer, resulting in an appreciable saving in manpower and time, and permitting the desired tasks to be expeditiously undertaken and completed to the mutual advantage of all concerned.

In carrying out a preferred embodiment of the invention, the forward end portion of the frame of the trailer is constructed to provide a sectional draw-bar or tongue, the rearward part or section of which is a stationary complement of the trailer frame and the forward section being hingedly mounted thereon so that the two sections may be placed in approximate coplanar alignment for normal load moving and towing purposes, and may be collapsed or opened to allow the trailer to be tilted for loading and unloading, this without disconnecting or unhitching the movable tongue section from the towing truck.

Briefly summarized, the over-all subject matter has to do with a novel combination embodying a two-wheeled trailer having a single centered axle and ground engaging wheels at its respective ends, a frame structure supported intermediate its front and rear ends on said axle and situated between the respective wheels, a body structure mounted atop said frame and open at its rear end and provided with a pivoted tail gate which when swung out and down may be temporarily used as a loading and unloading ramp, the forward end portion of said frame extending beyond the forward end of said body structure and embodying a draw-tongue, said tongue embodying a rigid section and a complemental relatively movable section, the latter hingedly connected with said rigid section and being swingable in a vertical plane on horizontal axes whereby the two sections may be temporarily parted and allowed to move into positions which are approximately divergent to each other, and a hitching member carried by the leading end of said movable section and connectible with a complemental hitching member or a towing truck, tractor or the like.

Other objects, features and advantages will become more readily apparent from the following description and the accompanying sheet of illustrative drawings.

In the drawings, wherein like numerals are employed to designate like parts throughout the views:

Figure 1 is a side elevational view showing a fragmentary portion at the rear end of a tow truck or equivalent powering vehicle, a two-wheeled trailer tilted and loaded with the aforementioned fork-lift, said trailer provided with the improved draw-bar or tongue and the joint between the sections being "open" to obviate the necessity of unhitching the trailer from the truck;

Figure 2 is a side elevational view of the same with the sections of the tongue closed and fastened together, the normal tongue arrangement, and showing the trailer loaded for transportation or other load handling requirements;

Figure 3 is a perspective view of the relatively movable or hingedly attached tongue section by itself;

Figure 4 is a plan view based on Figure 3 but also including the rigid tongue section on the forward end of the trailer frame, the two sections being fastened together; and Figure 5 is a section on an enlarged scale in elevation in part, the section being on the line 5—5 of Figure 4 looking in the direction of the arrows.

Referring now to the drawings and first to Figures 1 and 2, the two-wheeled trailer is a well known type which is currently in use. The customary two ground-engaging freely rotatable wheels (one shown) is denoted by the numeral 6. These wheels are, of course, mounted on the ends of a customary axle 8, not detailed. The chassis or frame 10 is of general elongate or rectangular form and made up of angle-irons and it is mounted intermediate its ends on the axle in any suitable manner, also not detailed. The crate-like body 12, of any suitable or well known construction, is mounted on the frame 10 so that the frame and body 12 may be positioned either in horizontal transporting or load carrying position seen in Figure 2, or the tilted loading and unloading position seen in Figure 1. The rear end of the body is open and, here, there is provided an outwardly and downwardly swingable tail gate 14 hinged suitably at 16 and which, when the trailer is tilted, constitutes a temporary ramp making it possible to drive the fork-lift 18 up the ramp and into the confines of the trailer body. Of course, when the "load" 18 moves to a position beyond the fulcruming point, the trailer tilts in the opposite direction. Before going into this further, reference is made to the fact that the load 18 may be any similar machine, such as a paving roller, small tractor and so on. Also, the powering means may be of any suitable construction, that is, a regular automobile, tractor, or, as here shown, a so-called tow truck 20. This is provided with a bar or the like 22, carrying a ball-type hitch member 24.

The essence of this invention is, as is obvious, in the construction of that portion of the frame 10 which projects beyond the forward end of the trailer body and which is expressly designed to provide a sectional draw-bar or tow of what is sometimes referred to as an openable and closable or collapsible type.

With reference to Figures 1, 2 and 4, the reference numerals 26—26 designate the forward spaced parallel ends of inverted angle bars, which are the side members of the trailer frame. These are bent and caused to converge and these convergent portions are denoted by the numerals 28—28 and they form the rigid section of the tongue. It will be noticed that there is a rigid cross-bar or equivalent plate or member 30 (see Figure 4) and this has its ends welded or otherwise secured at 32 to the spaced-apart angle irons 28—28. The extremites of these irons 28—28 are beveled downwardly as at 34 (see Figures 1 and 5). For convenience, the horizontal flange of each iron is denoted by the numeral 36 and the vertical flange by the numeral 38.

The relatively movable and complemental V-shaped section of the tongue is denoted, generally speaking, in Figure 3, by the numeral 40. This, also is made up of converging angle-irons 42—42 whose vertical flanges are designated by the numerals 44 and whose horizontal flanges are denoted by the numerals 46. The underlying angle-irons 48 and 50 may be treated as stabilizing members or braces for the section 40. The apical end of this section appears as a hollow box construction and actually includes a top plate 52 with a chain-hitching loop 54 (chain not shown), said plate having a depending abutment or rest 56 to receive the beveled ends 34—34 on the angle-irons 28—28, as brought out in Figures 4 and 5. There is also a filler collar or the like at 58 carrying the rod portion 60 of the hitch 62. This has the usual socket member 64 which is connectible with the ball member 24 in the manner shown in Figures 1 and 2. The numeral 66 in Figure 5 is merely another stabilizing member or brace for the hitch. Thus, the hitch here illustrated is a rigid complemental part of the movable section 42 of the tongue construction. The cross-member 30 is situated above a similar cross-member 68 which is welded or otherwise fixedly fastened to the angle irons of the movable section 42. These two members 30 and 68 have screw threaded holes to accommodate an insertable and removable fastening bolt 70 which functions, obviously, to fasten the two tongue sections in closed and rigid relationship. The bifurcated head 72 on the upper end of this bolt carries a pivotally mounted handle 74 which may be swung to an out-of-the-way position when not in use.

It will be clear that the respective angle-irons 28—28 and 42—42 are so made that they nest into one another, making it possible to lock the two sections 28 and 40 together for required rigidity or to remove the bolt and to permit the two sections to swing apart into open divergent relationship, as shown in Figure 1. Under this construction, the tongue of the trailer remains fastened to the tow truck and yet the tongue may "break joint" and the sections may be parted to assume the divergent relationship shown in Figure 1. This adaptation and arrangement allows the trailer to slant downwardly for loading and unloading purposes in the manner shown in Figure 1. It follows, therefore, that the provision of this simple and practicable openable and closable sectional tongue makes it possible to load and unload in the manner seen in Figure 1, or to provide a rigid tongue for hauling purposes.

The tail gate of the trailer is used as a ramp while the trailer tongue is hitched to the towing truck and the unit is in loading position. As the fork-lift is driven onto the trailer, and when it passes the fulcrum (which approximates the axle of the trailer), the front trailer frame lowers into the locking position with the trailer tongue, as shown. The bolt 70 is then inserted in the manner shown and the structure is locked.

Any suitable means may be employed to hingedly join the movable section 40 to its companion section. The means shown comprises cleats 75—75 affixed to the rearward ends of flanges 44 and having extensions 76 carrying ears 77 pivoted, as at 78, to the vertical flanges of the frame members, specifically, angle-irons 26—26.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In combination, a two-wheeled trailer embodying an axle having ground engaging wheels mounted for operation thereon, a frame structure supported intermediate its front and rear ends on said axle, a body structure mounted atop said frame and open at its rear end and provided with a pivoted tail gate which when swung out and down may be temporarily used as a loading and unloading ramp, the forward end portion of said frame extending beyond the forward end of said body structure and embodying a draw-tongue, said tongue embodying a rigid linearly straight section and a relatively movable correspondingly straight section, the latter section hingedly connected with said rigid section and being swingable in a vertical plane on horizontal axes whereby the two sections may be temporarily parted and thus moved into positions which are approximately divergent to each other, and a hitching member carried by the leading end of said movable section and connectible with a complemental hitching member or a towing truck, tractor or the like, said rigid section of said tongue being V-shaped in plan and said movable section being likewise and correspondingly V-shaped in plan, said sections being made up of complemental interlocking components which swing into superposed nested relationship when they are in closed load-drawing cooperation, said sections each having a rigidly mounted cross-member, said cross members being movable into positions wherein one cross-member is directly above the other cross-member, said cross-members having aligned screw-threaded holes, and a readily accessible insertable and removable screw-threaded connecting and retaining bolt for said cross-members threaded through said holes, whereby said sections are securely and rigidly fastened together and said tongue then functions as a linearly straight rigid entity.

2. In combination, a two-wheeled trailer embodying an axle having ground engaging wheels mounted for operation thereon, a frame structure supported intermediate its front and rear ends on said axle, a body structure mounted atop said frame and open at its rear end and provided with a pivoted tail gate which when swung out and down may be temporarily used as a loading and unloading ramp, the forward end portion of said frame extending beyond the forward end of said body structure and embodying a draw-tongue, said tongue embodying a rigid linearly straight section and a relatively movable correspondingly straight section, the latter section hingedly connected with said rigid section and being swingable in a vertical plane on horizontal axes whereby the two sections may be temporarily parted and thus moved into positions which are approximately divergent to each other, and a hitching member carried by the leading end of said movable section and connectible with a complemental hitching member or a towing truck, tractor or the like, said rigid section of said tongue being V-shaped in plan and said movable section being likewise and correspondingly V-shaped in plan, said sections being made up of complemental interlocking components which swing into superposed nested relationship when they are in closed load-drawing cooperation, said rigid section embodying a pair of converging angle-irons, said movable section being likewise made up of a pair of correspondingly converging angle-irons, the respective angle-irons being nested one into the other and interlocked rigidly together when the sections are closed, said sections each having a rigid cross-member, the latter being movable into superposed positions and having aligned screw-threaded holes, and an insertable and removable screw-threaded connecting and retaining bolt threaded through said holes, whereby said sections are securely and rigidly fastened together and said tongue then functions as a rigid entity.

References Cited in the file of this patent

UNITED STATES PATENTS

| | | |
|---|---|---|
| 2,328,343 | Jacob | Aug. 31, 1943 |
| 2,351,829 | Milner | June 20, 1944 |
| 2,603,529 | Troth et al. | July 15, 1952 |
| 2,628,126 | Black | Feb. 10, 1953 |
| 2,628,733 | Hale | Feb. 17, 1953 |

FOREIGN PATENTS

| | | |
|---|---|---|
| 760,730 | France | Dec. 27, 1933 |
| 585,726 | Great Britain | Feb. 21, 1947 |